March 17, 1942.                    J. V. CAPUTO                    2,276,925
                                 WELDING ELECTRODE
                                Filed June 24, 1940
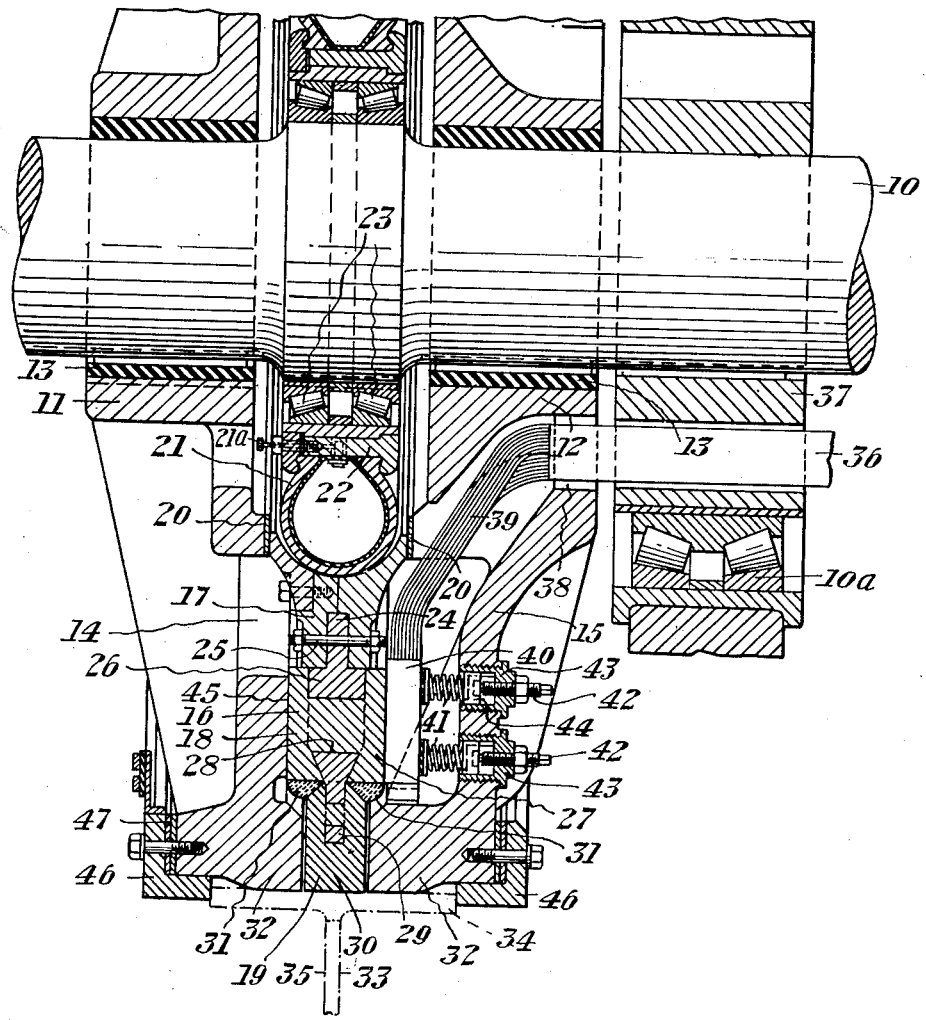
INVENTOR
James V. Caputo
by his attys
Stebbins and Blenko Patented Mar. 17, 1942

2,276,925

UNITED STATES PATENT OFFICE 2,276,925

WELDING ELECTRODE

James V. Caputo, Crafton, Pa.

Application June 24, 1940, Serial No. 342,181

8 Claims. (Cl. 219—4)

This invention relates to a welding electrode of the rotary or disc type adapted to engage elongated work-pieces progressively, and particularly to an electrode capable of exerting considerable pressure on the work.

This application is a continuation-in-part of my copending application Ser. No. 171,404, filed October 28, 1937, for Welding electrode, now Patent 2,205,680, issued June 25, 1940.

It has been customary heretofore to make rotary welding electrodes of this type of copper because of its high electrical conductivity. Copper, however, is subject to deformation because it is relatively soft, and this problem is quite serious in the welding of articles of material such as iron or steel, having a hardness considerably greater than that of copper.

I have invented a novel electrode construction including a contact and conducting portion composed of metal having a high electrical conductivity such as copper, and a strengthening member or reinforcement capable of withstanding the stresses to which the electrode may be subject in service. In a preferred embodiment, the electrode comprises a reinforcing ring of steel or the like encased in a sheath of copper or other suitable conducting material. An electrode of this type may be made at a cost much less than an electrode of conventional construction without sacrificing any of the desirable performance characteristics. Such embodiment of the invention is illustrated in the accompanying drawing, as applied to the welding of flat plates to form structural shapes. It will be understood, however, that the invention may also be applied to the welding of other articles such as pipe or the like.

The single figure of the drawing is a partial axial section through an electrode according to the invention.

Referring in detail to the drawing, a supporting shaft 10 is journaled in suitable bearings, one of which is shown at 10a. Hubs 11 and 12 are mounted on the shaft but insulated therefrom by sleeves 13. The hubs have radial discs 14 and 15 thereon between which is disposed an annular conducting member 16.

The conducting member 16 comprises a body portion 17, an intermediate ring 18 and a contact ring or rim 19. The body portion 17 is movable radially between the flanges 14 and 15, hardened bearing rings 20 being disposed therebetween to reduce wear. The conducting member 16 is normally held concentric with the shaft 10 by a yieldable, annular member, specifically a pneumatic tire 21 carried on a rim 22. The rim 22 is journaled on the shaft 10 on bearings 23. The tire has a valve stem 21a projecting therefrom.

The intermediate ring 18 has a tongue 24 extending into a slot in the body portion 17. The latter is split centrally to permit assembly with the ring 18 and the assembly is held together by bolts 25.

The tongue 24 is formed on an annular reinforcement 26 encased in a copper sheath 27, the reinforcement and sheath together constituting the intermediate ring 18. The reinforcement is preferably of a metal having a high strength such as steel, while the sheath is preferably of a metal having a high electrical conductivity, such as copper. If the electrode is to be used with alternating current, the reinforcement is made of manganese steel, i. e., steel having about 11% to 14% manganese, so as to be substantially non-magnetic, thereby minimizing the eddy current and hysteresis losses. The reinforcement has a plurality of holes 28 spaced circumferentially. The sheath 27 is preferably applied to the reinforcement by casting around the latter. When this is done, the metal forming the sheath flows through the holes 28 and forms a strong interlock between the reinforcement and the sheath.

The rim 19 is generally similar to the intermediate ring 18 in that it comprises a reinforcing annulus 29 and a sheath 30 of steel and copper, respectively. The rim 19 is formed separately from the intermediate ring, disposed thereon and secured thereto by welding at 31. The sheath 30 instead of being composed of copper may be of an alloy which has a high electrical conductivity and a hardness greater than that of copper.

The discs 14 and 15 are provided with peripheral flanges 32 adapted to engage a work-piece having progressive electrical contact with the rim 19 of the conducting member 16. As an example of such work-piece, I have shown a beam 33 being formed from a flange plate 34 and a web plate 35 by welding the edge of the latter to a central rib on the former. I-beams can be conveniently manufactured by welding plates disposed in this relation, on passing them through a welding throat composed of a pair of electrodes such as that which has been described, and a pair of cooperating electrodes (not shown) engaging the web plate. In carrying out this operation, the tire 21 permits yielding of the conducting member 16 relative to the flanges 32 which apply the welding pressure. The pressure exerted on the work by the conducting member is thus limited by the pressure existing within the tire.

The considerable pressure necessary to effect the welding of the beams may thus be safely applied without injury to the conducting member. At the same time, the annular reinforcement embedded in the ring 18 and the rim 19 strengthen them for resisting the forces which may be applied thereto.

Current is supplied to the conducting member 16 by conductors 36 which pass through and are insulated from a ring 37 on the shaft 10 which is supported in the bearing 10a. The ends of the conductors 36 extend through holes 38 spaced circumferentially of the disc 15. Connections 39 extend from the ends of the conductors 36 to contact blocks 40 engaging one of the side faces of the ring 18, being held in contact therewith by springs 41. Screws 42 are threaded in the ends of cups 43 spaced circumferentially of the disc 15 and are provided with backing blocks 44 which the springs 41 engage. By means of the screws 42, the pressure exerted by the springs on the blocks 40 may be varied as desired.

The lateral face of the ring 18 opposite that engaged by the blocks 40 engages a bearing surface 45 of the disc 14.

Guide rings 46 are removably secured to the outer, lateral faces of the discs 14 and 15 for engagement with the edges of the flange plate 34. The spacing between the guide rings may be varied by shims 47.

It will be apparent from the foregoing description that the invention provides a welding electrode of such construction that it is well adapted to withstand the high stresses involved in welding heavy work-pieces such as structural shapes, without injury. The full welding pressure is applied by the discs 14 and 15 which are well adapted to withstand such pressure. The conducting portion of the electrode is permitted to yield slightly so the pressure exerted thereon can never be greater than the pressure in the tire 21. The conducting portion of the electrode itself, furthermore, being composed of a sheath of material having a high conductivity and a core or reinforcement of a material having a high strength, is capable of performing its primary function, i. e., the transmission of current. At the same time, the reinforcement makes the electrode capable of withstanding considerable force without mechanical failure.

A further important advantage of the invention is the considerable reduction in the cost of the electrode effected thereby. The reinforcing rings 26 and 29 being of steel, cost much less per pound than the copper they replace, the ratio being only 1 to 5 or more. At the same time, the available section of copper is ample to carry the required current.

Although I have illustrated and described but a preferred embodiment of the invention, it will be recognized that changes in the construction and arrangement of the parts may be made without departing from the spirit of the invention or the scope of the appended claims.

I claim:

1. A welding electrode comprising an annulus of material having a good electrical conductivity cast around an annular reinforcing member having perforations spaced circumferentially thereof permitting flow of the metal composing the annulus through the reinforcing member to form interlocks therewith.

2. A welding electrode comprising an annular body of copper or like material, and a rim of an alloy having high electrical conductivity and a hardness greater than that of copper.

3. A rotary welding electrode comprising an annular member of metal of high electrical conductivity and an annular reinforcement, said member being cast around said reinforcement and said reinforcement having recesses in which said metal forms portions interlocking with the reinforcement.

4. A rotary welding electrode comprising a ring of metal of high electrical conductivity such as copper, and an annular reinforcement embedded coaxially therein composed of a metal having a high strength such as steel.

5. A rotary welding electrode comprising a ring of metal of high electrical conductivity such as copper, and a ring of metal having a high strength such as steel, encased in said first-mentioned ring.

6. A rotary welding electrode comprising a ring of metal of high electrical conductivity such as copper having a continuous periphery, and a ring of metal of high strength such as steel embedded therein, said second-mentioned ring having holes spaced circumferentially thereof, the metal of the first-mentioned ring extending into said holes and forming portions interlocking with said second-mentioned ring.

7. A rotary welding electrode comprising a ring of metal of high electrical conductivity such as copper, and an annular reinforcement embedded coaxially therein composed of a substantially non-magnetic metal.

8. A rotary welding electrode comprising a ring of metal of high electrical conductivity such as copper, and an annular reinforcement embedded coaxially therein composed of manganese steel.

JAMES V. CAPUTO.